United States Patent
Utsunomiya et al.

(10) Patent No.: US 9,236,747 B2
(45) Date of Patent: Jan. 12, 2016

(54) ELECTRONIC DEVICE

(71) Applicants: Seiko Instruments Inc., Chiba-shi, Chiba (JP); The Ritsumeikan Trust, Kyoto-shi, Kyoto (JP)

(72) Inventors: Fumiyasu Utsunomiya, Chiba (JP); Takakuni Douseki, Kusatsu (JP); Ami Tanaka, Kusatsu (JP)

(73) Assignee: SEIKO INSTRUMENTS INC., Kyoto (JP)

( * ) Notice: Subject to any disclaimer, the term of this patent is extended or adjusted under 35 U.S.C. 154(b) by 334 days.

(21) Appl. No.: 13/871,380

(22) Filed: Apr. 26, 2013

(65) Prior Publication Data

US 2013/0293202 A1   Nov. 7, 2013

(30) Foreign Application Priority Data

May 1, 2012   (JP) .................................. 2012-104539

(51) Int. Cl.
*H02J 7/00* (2006.01)
*H01M 10/44* (2006.01)
*H02J 7/34* (2006.01)

(52) U.S. Cl.
CPC ................. *H02J 7/00* (2013.01); *H02J 7/0068* (2013.01); *H01M 10/44* (2013.01); *H02J 7/345* (2013.01)

(58) Field of Classification Search
CPC .................................. H02J 7/0068; H02J 7/00
USPC ........................................................ 320/166
See application file for complete search history.

(56) References Cited

U.S. PATENT DOCUMENTS

| | | | | |
|---|---|---|---|---|
| 4,211,988 A | * | 7/1980 | Matsuura et al. ................ 334/16 |
| 4,818,934 A | * | 4/1989 | Tamamura ............... 324/762.08 |
| 5,723,914 A | * | 3/1998 | Nakayama et al. ........... 307/125 |
| 5,913,085 A | * | 6/1999 | Yamaguchi et al. .......... 396/205 |
| 6,327,127 B1 | | 12/2001 | Utsunomiya et al. |
| 6,584,043 B1 | * | 6/2003 | Koike et al. ................... 368/204 |
| 2005/0057192 A1 | * | 3/2005 | Yamamoto ......... H05B 41/2883 315/291 |
| 2008/0035870 A1 | * | 2/2008 | Wygnanski ............. F01L 1/185 251/129.15 |
| 2012/0126765 A1 | * | 5/2012 | Stone et al. ................... 323/283 |

FOREIGN PATENT DOCUMENTS

JP   11-288319 A   10/1999

* cited by examiner

*Primary Examiner* — M'Baye Diao
(74) *Attorney, Agent, or Firm* — Brinks Gilson & Lione

(57) ABSTRACT

Provided is an electronic device capable of supplying desired electric power to a load so as to operate the load even in a case where charged power is minute and a voltage increase rate of a capacitor, which increases by charge, is low. The electronic device includes: a power source which has supply power less than consumption power of the load; a capacitor to be charged with the supply power; and a charge/discharge control circuit which controls charging of the capacitor and consumption of charged power of the capacitor by the load, and the charge/discharge control circuit includes: a first node to which the supply power of the power source is supplied; and a circuit which charges the capacitor with the supply power from the first node.

3 Claims, 2 Drawing Sheets

ELECTRONIC DEVICE

RELATED APPLICATIONS

This application claims priority under 35 U.S.C. §119 to Japanese Patent Application No. 2012-104539 filed on May 1, 2012, the entire content of which is hereby incorporated by reference.

BACKGROUND OF THE INVENTION

1. Field of the Invention

The present invention relates to an electronic device including a charge/discharge control circuit, which is used to charge a capacitor with minute electric power, and to supply charged power of the capacitor to a load when a voltage of the capacitor to be increased by the charge reaches a predetermined voltage.

2. Description of the Related Art

In recent years, there have been an increasing number of electronic devices which operate by using electric power generated by sunlight in one's surroundings, a body temperature of a human being, or the like. A solar cell is known as one that generates electric power by sunlight, and a thermoelectric conversion element is known as one that generates electric power by the body temperature of a human being. However, these generators are downsized for improving portability and cutting costs, and hence the generated power is minute. Therefore, there have been an increasing number of cases where the generated power is less than the consumption power of the electronic devices. In this case, a charge/discharge control circuit is used to charge a capacitor with generated power once, and to supply charged power of the capacitor to the electronic device when enough electric power is charged for operating the electronic device for a predetermined period of time.

FIG. 4 illustrates a conventional electronic device including a charge/discharge control circuit. The electronic device includes a power source 401, a capacitor 405, a control circuit 406 for controlling charge/discharge, and an electronic device body circuit 407 serving as a load. The power source 401 includes a thermoelectric conversion element 402, a booster circuit 403, and a Schottky diode 404.

The thermoelectric conversion element 402 converts a temperature, such as a body temperature and an outside air temperature, into generated power and outputs the generated power. The generated power output from the thermoelectric conversion element 402 has a voltage less than an operation voltage of the electronic device body circuit 407. Therefore, in the booster circuit 403, the generated power is converted into boost power having a voltage equal to or more than the operation voltage of the electronic device body circuit 407. The boost power is output from the booster circuit 403 via the Schottky diode 404 for preventing reverse flow, and charges the capacitor 405. The control circuit 406 includes a switching element and a voltage detection circuit, and a hysteresis circuit and a delay circuit, or a latch circuit, a timer circuit, and a delay circuit. The voltage detection circuit monitors a voltage of the capacitor 405, and hence monitors a charge amount of the capacitor 405, thereby detecting that the charge amount of the capacitor 405 has reached electric power high enough for operating the electronic device body circuit 407 for a predetermined period of time.

When the control circuit 406 detects the above-mentioned state, the switching element is turned ON, thereby supplying charged power of the capacitor 405 to the electronic device body circuit 407. When the control circuit 406 includes the hysteresis circuit and the delay circuit, a detection voltage is provided with hysteresis, and the switching element is turned ON after a delay period of the delay circuit. Then, the charged power of the capacitor 405 is supplied to the electronic device body circuit 407 until the voltage of the capacitor 405 becomes a hysteresis voltage. When the control circuit 406 includes the latch circuit, the timer circuit, and the delay circuit, after detecting the voltage of the capacitor 405, inversion of the latch circuit and operation of the timer circuit are performed during a delay time of the delay circuit. Then, the switching element is turned ON after the delay time of the delay circuit. Then, until the latch circuit is reset by the timer circuit, the charged power of the capacitor 405 is supplied to the electronic device body circuit 407. When the charged power of the capacitor 405 is supplied to the electronic device body circuit 407, the electronic device body circuit 407 operates (see, for example, Japanese Patent Application Laid-open No. Hei 11-288319).

In the above-mentioned conventional electronic device including a charge/discharge control circuit, the voltage of the capacitor is monitored, and, when it is detected that the voltage of the capacitor has become a predetermined voltage, the charged power of the capacitor is supplied to the electronic device body circuit serving as a load. In this configuration, during the delay time, which is after it is detected that the voltage of the capacitor has become the predetermined voltage and until the switching element is turned ON, it is required to determine the inversion of the latch circuit or the operation of the hysteresis circuit before the switching element is turned ON. In order to invert the latch circuit or operate the hysteresis circuit, a potential difference of several mV or more is necessary after the start of the operation and until the completion thereof During the above-mentioned delay time, the voltage of the capacitor needs to increase to this potential difference or more. When the switching element starts being turned ON in a state where the voltage of the capacitor has not reached this voltage or more, the electric power to be supplied to the electronic device body circuit gradually increases. When this electric power becomes equal to the charged power, the voltage of the capacitor stops increasing. Then, when the voltage of the capacitor stops increasing, the operation of the control circuit 406 stops while the operation of the latch circuit or the hysteresis circuit and an ON resistance of the switching element are left in an indefinite state. The charged power keeps being consumed by the electronic device. As a matter of course, as compared to the electric power necessary for the operation of the electronic device body circuit, the charged power in this case is much smaller, and hence the electronic device body circuit cannot perform a desired operation.

As described above, in the conventional electronic device including a charge/discharge control circuit, there has been a problem that desired electric power cannot be supplied to a load in a case where the charged power is minute and the voltage increase rate of the capacitor, which increases by charge, is low. Further, the generated power is decreased due to downsizing of the generator, and a consumption current is increased due to improvement of functions and performance in the electronic device operated by the generated power, and hence there have been an increasing number of cases where a capacitance value is increased, with the result that the above-mentioned problem is liable to occur.

SUMMARY OF THE INVENTION

The present invention has been made in view of the above-mentioned problem, and provides an electronic device including a charge/discharge control circuit, which supplies larger charged power of a capacitor to a load by more minute electric power.

In order to solve the conventional problem, the electronic device according to the present invention has the following configuration.

The electronic device includes: a load which has a desired function; a power source which has supply power less than consumption power of operation of the load; a capacitor to be charged with electric power based on the supply power; and a charge/discharge control circuit which controls charging of the capacitor with the electric power based on the supply power and consumption of charged power of the capacitor by the load. The charge/discharge control circuit includes: a first node to which the electric power based on the supply power is supplied; and a circuit which charges the capacitor with the electric power supplied to the first node. When it is detected that a voltage of the first node is a predetermined voltage or more, one of reduction and interruption of the electric power charging the capacitor is performed, and thereafter the load is operated by the charged power of the capacitor.

The electronic device including a charge/discharge control circuit according to the present invention can supply larger charged power of the capacitor to the load by more minute electric power as compared to the conventional electronic device including a charge/discharge control circuit. Therefore, the electronic device including a charge/discharge control circuit according to the present invention can operate a more highly functional load by using a more compact power source such as a generator.

DETAILED DESCRIPTION OF THE PREFERRED EMBODIMENT

Figure 1:
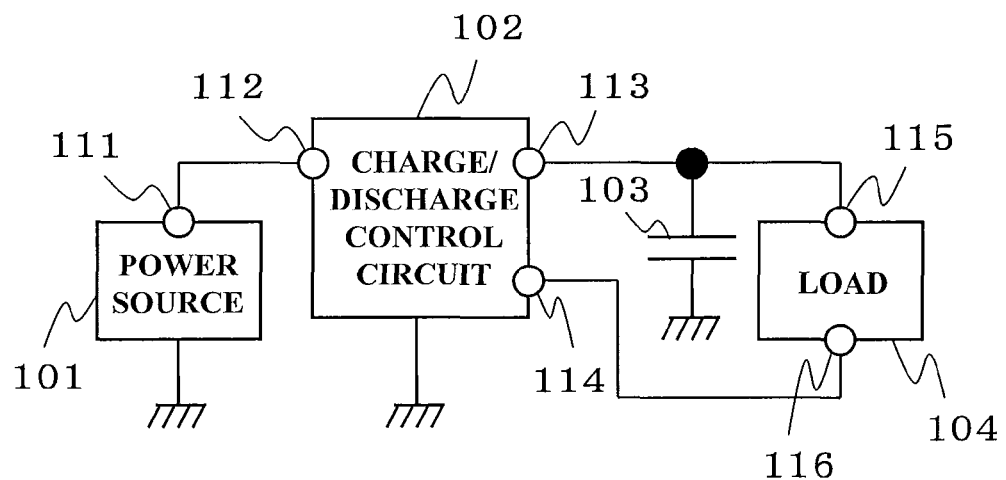
FIG. 1 is a schematic circuit diagram illustrating an electronic device including a charge/discharge control circuit according to an embodiment of the present invention.

An embodiment of the present invention is hereinafter described with reference to the attached drawings.
Embodiment of the Present Invention FIG. 1 is a schematic circuit diagram illustrating an electronic device including a charge/discharge control circuit according to the embodiment of the present invention.

The electronic device according to the embodiment of the present invention includes a power source 101, a charge/discharge control circuit 102, a capacitor 103, and a load 104.

The power source 101 may be a generator for generating electric power by using energy in one's surroundings, such as light, heat, or vibration, or an extremely compact power source. Electric power supplied from the power source 101 is smaller than the consumption power of the load 104. The power source 101 has an output terminal 111 connected to an input terminal 112 of the charge/discharge control circuit 102. The charge/discharge control circuit 102 has a positive electrode terminal 113 connected to a first electrode of the capacitor 103 and a positive electrode terminal 115 of the load 104, and a negative electrode terminal 114 connected to a negative electrode terminal 116 of the load 104. The capacitor 103 has a second electrode connected to the reference power supply terminal (GND).

Figure 2:
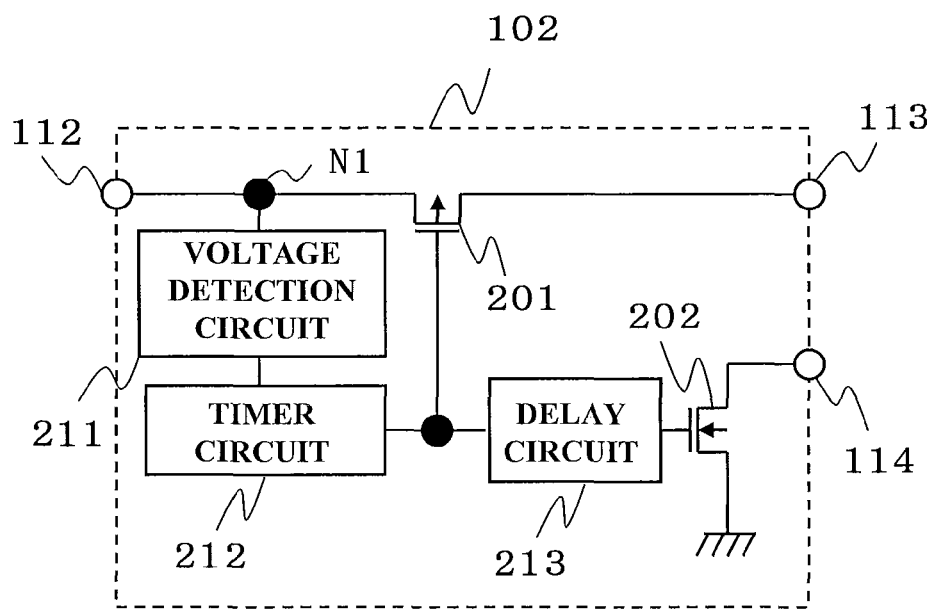
FIG. 2 is a schematic circuit diagram illustrating one example of the charge/discharge control circuit.

FIG. 2 is a schematic circuit diagram illustrating one example of the charge/discharge control circuit 102.

The charge/discharge control circuit 102 includes the input terminal 112, a node N1, a voltage detection circuit 211, a timer circuit 212, a delay circuit 213, a PMOS transistor 201, an NMOS transistor 202, the positive electrode terminal 113, and the negative electrode terminal 114.

The input terminal 112 is connected to the node N1, and the node N1 is connected to a source of the PMOS transistor 201 and the voltage detection circuit 211. The voltage detection circuit 211 monitors a voltage of the node N1, and outputs a detection signal to the timer circuit 212 when detecting that the voltage of the node N1 is a predetermined voltage or more. The timer circuit 212 has an output connected to a gate of the PMOS transistor 201 and an input of the delay circuit 213. When receiving the detection signal from the voltage detection circuit 211, the timer circuit 212 turns OFF the PMOS transistor 201, which has been turned ON, for a predetermined period, and turns OFF the PMOS transistor 201 again afterward. The delay circuit 213 outputs an output signal of the timer circuit 212 to a gate of the NMOS transistor 202 after a predetermined delay period. The PMOS transistor 201 has a drain connected to the positive electrode terminal 113. The NMOS transistor 202 has a drain connected to the negative electrode terminal 114, and a source connected to the reference power supply terminal (GND).

Next, description is given of the operation of a configuration in which the charge/discharge control circuit illustrated in FIG. 2 is used in the electronic device including a charge/discharge control circuit illustrated in FIG. 1 according to the embodiment of the present invention.

Description is first given of a state in which the voltage of the node N1 is less than the predetermined voltage, counting of the timer circuit 212 and operation of the delay circuit 213 are finished, the PMOS transistor 201 is turned ON, and the NMOS transistor 202 is turned OFF. The electric power from the power source 101 charges the capacitor 103 via the node N1 and the PMOS transistor 201, and a voltage of the capacitor 103 increases. At that time, the PMOS transistor 201 is turned ON, and hence the voltage of the capacitor 103 and the voltage of the node N1 are equal to each other. The NMOS transistor 202 is turned OFF, and hence charged power of the capacitor 103 is not consumed by the load 104. When the voltage detection circuit 211 detects that the voltage of the node N1, which increases in accordance with the increase in voltage of the capacitor 103, is the predetermined voltage or more, the timer circuit 212 turns OFF the PMOS transistor 201, and the NMOS transistor 202 is turned ON after a delay time of the delay circuit 213.

When the NMOS transistor 202 is turned ON, the load 104 starts its operation by the charged power of the capacitor 103. Then, the charged power of the capacitor 103 is consumed by the load 104, and the voltage of the capacitor 103 decreases. On the other hand, the PMOS transistor 201 is turned OFF before the NMOS transistor 202 is turned ON, and hence the voltage of the node Ni does not decrease in accordance with the decrease in voltage of the capacitor 103, but abruptly increases. Therefore, the voltage detection circuit 211 reliably maintains the detection state without stopping in an indefinite state. In other words, the NMOS transistor 202 reliably maintains the ON state, and hence the load 104 performs a desired operation by the charged power of the capacitor 103.

When the timer circuit 212 finishes counting a predetermined period of time, the PMOS transistor 201 is turned ON, and the NMOS transistor 202 is turned OFF after the delay time of the delay circuit 213. Then, the charged power of the capacitor 103 is stopped being consumed by the load 104, and the voltage of the capacitor 103, which has become less than the predetermined voltage due to the consumption of the charged power by the load 104, becomes equal to the voltage of the node N1. Therefore, the voltage detection circuit 211 detects that the voltage of the node N1 is less than the predetermined voltage, and hence the above-mentioned series of operations returns to the initial state thereof.

The above-mentioned series of operations is repeated, and the load 104 repeats the desired operation at certain intervals.

Figure 3:
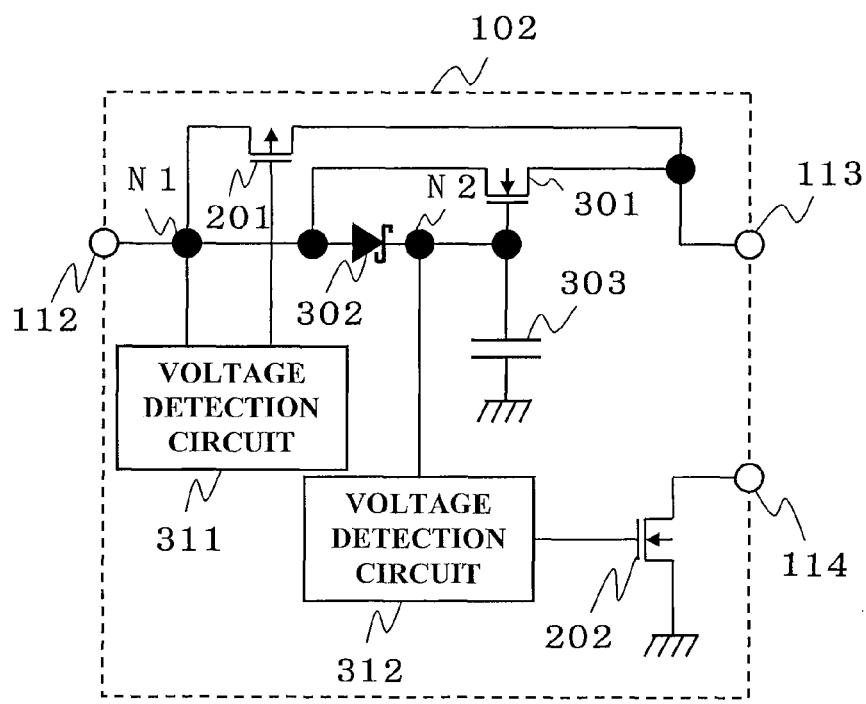
FIG. 3 is a schematic circuit diagram illustrating another example of the charge/discharge control circuit.
Figure 4:
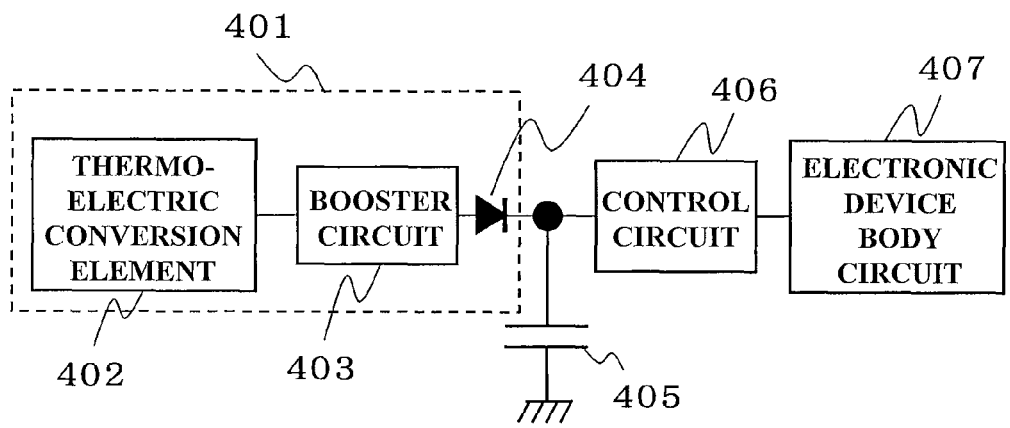
FIG. 4 is a schematic circuit diagram illustrating a conventional electronic device including a charge/discharge control circuit.

FIG. 3 is a schematic circuit diagram illustrating another example of the charge/discharge control circuit.

The charge/discharge control circuit 102 includes the input terminal 112, the node N1, a node N2, a first voltage detection circuit 311, a second voltage detection circuit 312, a capacitor 303, the PMOS transistor 201, the NMOS transistor 202, the positive electrode terminal 113, the negative electrode terminal 114, a Schottky diode 302, and an NMOS transistor 301.

The input terminal 112 is connected to the node N1. The node N1 is connected to the source of the PMOS transistor 201, a p-type terminal of the Schottky diode 302, a drain of the NMOS transistor 301, and the first voltage detection circuit 311. The Schottky diode 302 has an n-type terminal connected to the node N2. The node N2 is connected to a one-side electrode of the capacitor 303, which has another one-side electrode connected to the reference power supply terminal (GND), a gate of the NMOS transistor 301, and the second voltage detection circuit 312.

The first voltage detection circuit 311 monitors the voltage of the node N1, and turns OFF the PMOS transistor 201 when detecting that the voltage of the node N1 is a predetermined voltage or more. The second voltage detection circuit 312 monitors the voltage of the node N2, and turns ON the NMOS transistor 202 when detecting that the voltage of the node N2 is a predetermined voltage or more. The PMOS transistor 201 has the drain connected to a source of the NMOS transistor 301, and the positive electrode terminal 113. The NMOS transistor 202 has the drain connected to the negative electrode terminal 114, and the source connected to the reference power supply terminal (GND). Note that, when the first voltage detection circuit 311 has just detected that the voltage of the node N1 is the predetermined voltage or more, the voltage of the node N2 has not increased to the predetermined voltage or more, which is detected by the second voltage detection circuit 312.

Next, description is given of the operation of a configuration in which the charge/discharge control circuit illustrated in FIG. 3 is used in the electronic device including a charge/discharge control circuit illustrated in FIG. 1 according to the embodiment of the present invention.

Description is first given of a state in which the voltages of the node N1 and the node N2 are less than the respective predetermined voltages, the PMOS transistor 201 is turned ON, and the NMOS transistor 202 is turned OFF. The electric power from the power source 101 charges the capacitor 103 via the node N1 and the PMOS transistor 201, and the voltage of the capacitor 103 increases. The electric power from the power source 101 is also supplied to the node N2 via the node N1 and the Schottky diode 302. At that time, the PMOS transistor 201 is turned ON, and hence the voltage of the capacitor 103 and the voltage of the node N1 are equal to each other, and the voltage of the node N2 is a value obtained by subtracting a forward voltage of the Schottky diode 302 from the voltage of the node N1. The voltage between the source and the drain of the NMOS transistor 301 is equal to the voltage of the node N1, and the voltage of the gate thereof is equal to the voltage of the node N2, and hence the NMOS transistor 301 is turned OFF. The NMOS transistor 202 is also turned OFF, and therefore the charged power of the capacitor 103 is not consumed by the load 104.

When the first voltage detection circuit 311 detects that the voltage of the node N1, which increases in accordance with the increase in voltage of the capacitor 103, is the predetermined voltage or more, the PMOS transistor 201 is turned OFF. Then, when the second voltage detection circuit 312 detects that the voltage of the node N2, which increases in accordance with the increase in voltage of the node N1, is the predetermined voltage or more, the NMOS transistor 202 is turned ON. When the NMOS transistor 202 is turned ON, the load 104 starts its operation by the charged power of the capacitor 103. Then, the charged power of the capacitor 103 is consumed by the load 104, and the voltage of the capacitor 103 decreases. On the other hand, the PMOS transistor 201 is turned OFF before the NMOS transistor 202 is turned ON, and hence the voltage of the node N1 does not decrease in accordance with the decrease in voltage of the capacitor 103, but abruptly increases. Therefore, the first voltage detection circuit 311 reliably maintains the detection state without stopping in an indefinite state.

The voltage of the node N2 increases in accordance with the increase in voltage of the node N1, and hence the second voltage detection circuit 312 reliably maintains the ON state. Therefore, the load 104 performs a desired operation by the charged power of the capacitor 103.

The charged power of the capacitor 103 is consumed by the load 104, and the voltage of the capacitor 103 decreases. When the voltage of the capacitor 103 decreases to such an extent that the NMOS transistor 301 is turned ON, the node N1 and the capacitor 103 are connected to each other via the NMOS transistor 301. Therefore, the voltage of the node N1 decreases to the voltage of the capacitor 103. Because the voltage of the capacitor 103 is less than the predetermined voltage of the node N1, the first voltage detection circuit 311 turns ON the PMOS transistor 201 again. At that time, the voltage of the node N2 is the predetermined voltage or more for a while due to the capacitor 303. During this period, the NMOS transistor 301 and the NMOS transistor 202 are held in an ON state, and the load 104 keeps operating. Then, the voltage of the node N2 gradually decreases due to the consumption power of the second voltage detection circuit 312. Eventually, the voltage of the node N2 becomes less than the predetermined voltage, the second voltage detection circuit 312 turns OFF the NMOS transistor 202, and the above-mentioned series of operations returns to the initial state thereof.

The above-mentioned series of operations is repeated, and the load 104 repeats the desired operation at certain intervals.

As described above, in the electronic device including a charge/discharge control circuit according to the embodiment of the present invention, the electric power of the power source which has supply power less than the consumption power of the load charges the capacitor once, and it is detected that the charge amount of the capacitor has reached a state in which the load may be operated for a predetermined period of time. In a configuration in which the load is operated by the charged power of the capacitor, the load can be reliably operated even in a conventional case where the electric power of the power source is too small or the capacitance value of the capacitor is too large to operate the load.

In the above-mentioned electronic device including a charge/discharge control circuit according to the embodiment of the present invention, the PMOS transistor is used to disconnect the capacitor from the node which detects the charge amount of the capacitor. However, it should be understood that any configuration may be adopted as long as the charge amount of the capacitor has the electric power less than the electric power of the power source.

In the above-mentioned electronic device including a charge/discharge control circuit according to the embodiment of the present invention, the NMOS transistor is used to stop the consumption of the charged power of the capacitor by the load. However, it should be understood that any configuration may be adopted as long as the consumption power of the load is less than the electric power of the power source.

As a matter of course, a generator which generates electric power, such as a solar cell, a thermoelectric conversion element, and a vibration power generator, can be used as the power source. It should be understood that there may be used, as the power source, an electric cell having a small supply capability or high internal resistance, or an electric cell having a configuration in which different metals are immersed in an electrolyte liquid. Further, the capacitor may be any capacitor having a charging voltage which increases in accordance with the increase in charged power thereof. It should be understood that a secondary battery may be used as the capacitor as long as the secondary battery has the above-mentioned characteristic.

What is claimed is:

1. An electronic device, comprising:
a load which has a desired function;
a power source which has supply power less than consumption power of operation of the load;
a capacitor to be charged with electric power based on the supply power; and
a charge/discharge control circuit which controls charging of the capacitor with the electric power based on the supply power and consumption of charged power of the capacitor by the load,
wherein the charge/discharge control circuit comprises:
a first node to which the electric power based on the supply power is supplied;
a second node to which the capacitor is coupled; and
a circuit connected between the first node and the second node configured to charge the capacitor via the second node from power received at the first node; and
wherein when a voltage of the first node is a predetermined voltage or more, the circuit is configured to reduce or discontinue charging of the capacitor, and thereafter the load is operated by the charged power of the capacitor.

2. An electronic device according to claim 1,
wherein the charge/discharge control circuit comprises:
a first voltage detection circuit which detects the voltage of the first node;
a timer circuit which counts a predetermined period of time; and
a delay circuit which delays a signal, and
wherein, when the first voltage detection circuit detects that the voltage of the first node is the predetermined voltage or more, one of reduction and interruption of the electric power charging the capacitor is performed during a count period of the timer circuit, and the load is operated by the charged power of the capacitor during a period corresponding to the count period, which is delayed by the delay circuit.

3. An electronic device according to claim 1,
wherein the charge/discharge control circuit comprises:
a first voltage detection circuit which detects that the voltage of the first node is a first voltage or more; and
a second voltage detection circuit which detects that the voltage of the first node is a second voltage or more, the second voltage being higher than the first voltage, and
wherein, when the first voltage detection circuit detects that the voltage of the first node is the first voltage or more, one of reduction and interruption of the electric power charging the capacitor is performed, and, when the second voltage detection circuit detects that the voltage of the first node is the second voltage or more, the load is operated by the charged power of the capacitor.

* * * * *